United States Patent [19]

Laing et al.

[11] 3,729,071
[45] Apr. 24, 1973

[54] COMBINED OVERSPEED SAFETY BRAKE AND REVERSE HOLDBACK MECHANISM FOR ELEVATORS

[75] Inventors: Marvin R. Laing, Edina; Adwell B. Morris, Faribault, both of Minn.

[73] Assignee: Humphrey Elevator and Truck Company, Faribault, Minn.

[22] Filed: Apr. 8, 1971

[21] Appl. No.: 132,283

[52] U.S. Cl. ................................................. 188/189
[51] Int. Cl. ................................................. B60t 1/00
[58] Field of Search .................... 188/187, 180, 189, 188/185, 184

[56] References Cited

UNITED STATES PATENTS

| | | | |
|---|---|---|---|
| 3,415,343 | 12/1968 | Svensson | 188/187 X |
| 1,537,624 | 5/1925 | Simpson | 188/187 |
| 2,596,318 | 5/1952 | Willi et al. | 188/187 X |

Primary Examiner—Evon C. Blunk
Assistant Examiner—Hadd S. Lane
Attorney—Williamson, Palmatier & Bains

[57] ABSTRACT

A rotary drive shaft of an elevator is provided with a double acting brake mechanism having a first set of centrifugally actuable strike elements pivotal to a stop position to engage a first stationary stop member when the rotational speed of the drive shaft exceeds a predetermined level in the normal direction of rotation, and a second set of strike elements with contact surfaces thereon facing in the opposite direction from contact surfaces on the first set of strike elements and pivotal to a stop position to engage a second stationary stop member oriented to cooperate with the second strike elements in preventing reverse rotation of the drive shaft. The two sets of strike elements are supported in spaced relation along the rotational axis of the drive shaft on an annular clamping member of a disc brake assembly by means of common pivot pins extending parallel to the axis of rotation of the drive shaft.

8 Claims, 10 Drawing Figures

Patented April 24, 1973

INVENTORS
Marvin R. Laing,
Adwell B. Morris
BY
Williamson, Palmatier
& Bains
ATTORNEYS

Patented April 24, 1973

INVENTORS
Marvin R. Laing,
Adwell B. Morris
BY Williamson, Palmatier
& Bains
ATTORNEYS

COMBINED OVERSPEED SAFETY BRAKE AND REVERSE HOLDBACK MECHANISM FOR ELEVATORS

BRIEF SUMMARY OF THE INVENTION

This application is a continuation-in-part of a copending application titled "Overspeed Safety Brake for Elevators" filed on Oct. 26, 1970, under Ser. No. 83,703, now U.S. Pat. No. 3,695,399. The previously filed application is directed to a disc brake in combination with a set of strike elements or pawls mounted on a rotary component of the brake mechanism and pivotal to a stop position for engagement with a stationary stop member under the influence of centrifugal force at a predetermined rotational speed of an elevator drive or head shaft indicative of an overload condition or mechanical failure. The strike elements and stationary stop member disclosed in the aforesaid pending application are oriented to prevent excessive speed of the drive shaft and elevator in the normal direction of movement for proper operation.

This invention is particularly characterized by the combination with the aforesaid brake mechanism of the above-identified application of a second set of holdback strike elements mounted on the same rotary component of the brake mechanism as the first set of so-called overspeed strike elements and so oriented as to engage a second, stationary stop member when displaced to a stop position to prevent and limit rotation of the elevator drive shaft in a reverse direction, thereby preventing reverse travel of the elevator load. The second set of holdback strike elements are compactly combined with the overspeed strike elements to actuate a disc brake which is effective to stop the elevator drive shaft upon the attainment of runaway speeds in the normal direction of rotation or upon accidental reversal of the drive shaft.

A particularly advantageous feature of our improved brake mechanism resides in the use of overspeed strike elements and holdback strike elements of elongated, arcuate shape generally conforming to the outer peripheral contour of an annular brake member with which they rotate and on which they are mounted at spaced apart locations along the rotational axis of said annular member by means of common pivot pins extending generally parallel to said rotational axis. The overspeed strike elements and the holdback strike elements have contact surfaces thereon facing in opposite directions so as to be effective to cooperatively engage their respective, stationary stop members to halt the rotation of the elevator drive shaft in either the normal, operational direction, when a dangerous operating condition is encountered, or upon reverse rotation.

As a further beneficial aspect of the brake mechanism, the aforesaid annular brake member is comprised of an elongated, cylindrical segment on which the overspeed strike elements and the holdback strike elements are mounted in axially spaced relation, and an annular wall portion serving as a clamping device in cooperation with an annular braking plate to hold a plurality of brake discs therebetween in frictional engagement with each other. In one embodiment of our double acting brake mechanism, both the overspeed strike elements and the holdback strike elements are pivotal outwardly to stop positions under the influence of centrifugal force at a predetermined rotational speed of the elevator drive shaft. In this form of the brake mechanism, the overspeed strike elements and the holdback strike elements are of identical configuration, and have contact surfaces thereon of identical contour, the two sets of strike elements being oriented in inverted relation to each other on the aforesaid annular brake member so as to be effective to stop the elevator drive shaft in either a clockwise or counter-clockwise direction of rotation.

In an alternative form of the double acting brake mechanism, the overspeed strike elements are pivoted to a stop position under the influence of centrifugal force at predetermined excessive speeds of the elevator drive shaft; however, the holdback strike elements are normally held in an outwardly displaced stop position by springs so that they will be effective immediately upon any reverse rotation of the elevator drive shaft to rotate into engagement with their stationary stop element to halt the further rotation of the drive shaft in a reverse direction.

These and other objects and advantages of our invention will become readily apparent as the following description is read in conjunction with the accompanying drawings wherein like reference numerals have been used to designate like elements throughout the several views.

DESCRIPTION OF THE PREFERRED EMBODIMENTS

The double acting safety brake of this invention has been particularly designed with a view towards preventing runaway travel of an elevator in the downward direction under load and the influence of gravity, in either the normal direction of elevator movement or in a reverse direction. As with the braking device disclosed in the above-identified copending application, which was constructed and arranged to prevent excessive speed of an elevator only in the normal direction of elevator movement, we contemplate that the double acting brake mechanism disclosed herein may be used on various types of elevators employed for moving personnel or freight loads between different floor levels. Reference is made to the aforesaid copending application for an example of an endless belt type of manlift elevator which is illustrative of one form of an elevator to which the double acting brake mechanism of this invention may be applied. As with the elevator disclosed in said copending application, there is normally a head or drive shaft which supplies power to the elevator. In the accompanying drawings disclosing the preferred embodiments of our double acting brake mechanism, such a head or drive shaft has been designated by reference numeral 1.

Referring now to FIGS. 1 through 4 of the drawings, the double acting brake mechanism of this invention is shown mounted on drive shaft 1, and includes a disc brake assembly generally indicated by reference numeral 2. Brake assembly 2 includes as a primary component thereof a first annular member 4 in the form of a circular plate having an elongated cylindrical hub portion 6 connected to drive shaft 1 by a key 8. A set screw 10 in hub 6 secures key 8 tightly against head shaft 1, thereby securely restraining annular plate 4 against lateral displacement along shaft 1. Coupled to annular plate 4 at a location adjacent the outer periphery thereof for reasons hereinafter explained, are a first plurality of driving brake discs 12 which lie in planes normal to the longitudinal axis of rotation of head shaft 1, and which are laterally spaced along said axis. Discs 12 are coupled to annular plate 4 for rotation therewith by means of a first set of elongated connectors 14 threadedly attached at their inner ends to plate 4. A second plurality of annular, driven braking discs 16 are interleaved with driving discs 12, both sets of discs 12 and 16 extending in parallel planes. Driven discs 16 are coupled by means of a second set of elongated connectors 18 to annular wall portion 20 of an annular brake member 22, wall portion 20 being spaced apart from annular plate 4 along the longitudinal axis of head shaft 1. Annular member 22 serves as a clamping device in cooperation with annular plate 4 to tightly hold discs 12 and 16 therebetween in frictional association with each other. Although the frictional coation between discs 12 and 16 could be accomplished by abutting these discs directly against each other, I prefer to accomplish this by utilizing a third set of friction discs 24 sandwiched between adjacent pairs of driving and driven discs 12 and 16 and held in place against lateral displacement by frictional contact therewith.

Figure 5:
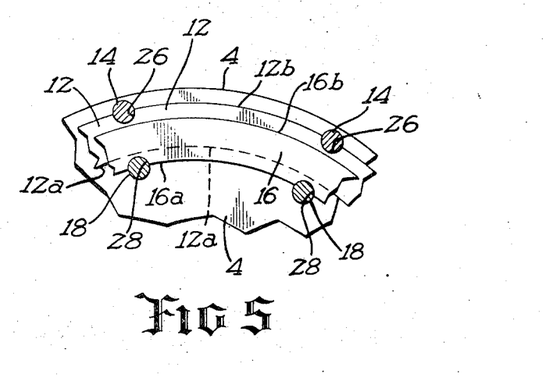
FIG. 5 is a fragmentary, vertical section view showing a portion of the disc brake, and taken along lines 5—5 of FIG. 3.

The selective and independent coupling of driving discs 12 to annular plate 4 and of driven discs 16 to braking clamp 22 is accomplished by providing radially offset portions of discs 12 and 16 at their inner and outer peripheries through which first and second sets of coupling members 14 and 18 extend. As may be noted most clearly by reference to FIGS. 3 and 5, this is preferably achieved by vertically or radially staggering plates 12 and 16. The outer periphery of driving discs 12 is disposed radially outwardly beyond the outer periphery of driven discs 16, and the first set of threaded connectors 14 extend through an outer peripheral portion of discs 12 at a location radially outwards from discs 16. The coupling engagement of threaded connectors 14 with discs 12 is achieved by providing a plurality of circumferentially spaced notch apertures 26 around the outer periphery of discs 12 through which elongated connectors 14 extend. This arrangement insures that discs 12 will be shiftably adjustable along coupling members 14 for a purpose hereinafter explained. Driven discs 16 are offset from outer discs 12 radially inwardly therefrom, thereby having inner peripheral portions disposed radially inwardly from discs 12 to receive the second set of coupling members 18. In FIG. 5 the inner and outer peripheral edges of discs 12 have been designated by reference numerals 12a and 12b, and the numerals 16a and 16b designate the inner and outer peripheral edges respectively of discs 16. A plurality of circumferentially spaced notches 28 in inner discs 16 receive the second, inwardly disposed set of coupling members 18, which are threadedly connected to annular wall 20 of braking clamp 22. Threaded connectors 18 are disposed radially inwardly from the inner periphery of driving discs 12 to avoid interference therewith. This particular coupling arrangement for the discs 12 and 16 permits the utilization of a plurality of discs for increased braking surface in a manner that provides for the selective coupling of the driving and driven discs to their respective annular members for independent rotation. Also, friction discs 24 are constrained and aligned radially by contact of their inner peripheral edges with inner coupling members 18; and outer coupling members 14 may be relied upon to limit the outward movement of discs 24.

The use of elongated coupling members in the form of threaded connectors 14 and 18 permits the sliding, lateral adjustment of discs 12 and 16 thereon so that the desired frictional pressure between the plurality of discs may be achieved. To this end, annular brake member 22 is slidably shiftable on hub 6 and is provided with mechanical adjusting means for shifting it towards braking plate 4 in a direction parallel to the axis of rotation of head shaft 1. The mechanical adjusting means preferably comprises a clamping ring 30 which bears against the outer end surface 22a of annular brake member 22. Clamping ring 30 is attached to hub portion 6 of annular plate 4 by a plurality of circumferentially spaced cap screws 32. Thus, the tightening of cap screws 32 will serve to shift clamping ring 30 and annular brake and clamping member 22 towards annular plate 4 with the result that braking discs 12, 16 and 24 will be more tightly clamped together to increase the frictional coaction therebetween. In this way, the braking force applied by disc brake 2 can be increased or adjusted as required for a particular load on an elevator.

Braking action is accomplished by stopping braking member 22 and driven discs 16 coupled thereto in response to emergency or overload conditions on an elevator or conveyor driven by shaft 1. For the purpose of preventing runaway speeds of drive shaft 1 in its normal direction of rotation, indicated by the solid arrow in FIG. 2 to be a clockwise direction for illustrative purposes, a first pair of pawls or strike elements 34, 36 are pivotally attached to braking member 22 for rotation therewith. For purposes of distinguishing from a second set of pawls hereinafter described, pawls 34, 36 will be referred to as overspeed pawls. As may be noted most clearly by reference to FIGS. 1, 3 and 4, pawls 34 and 36 are of arcuate shape and extend around a cylindrical segment 22b of brake member 22 in generally conforming relation thereto, pawls 34 and 36 being connected together at their opposite ends by links 38 so that they will move together. Pawls 34 and 36 are each comprised of end portions or arm sections 34a and 36a respectively of enlarged width, and narrow arm sections 34b and 36b respectively. End portions 34a and 36a are relatively heavy with respect to opposed end portions 34b and 36b. A pair of pivot pins 39 and 40 extending through raised annular collars 22c and 22d of brake member 22 into inner wall portion 20 thereof serve to hold pawls 34 and 36 in place. Pivot pins 39 and 40 extend in a direction generally parallel to the rotational axis of drive shaft 1 and are secured in position by means of lock pins 41 inserted through annular collar 22d of brake member 22 in a radial direction and extending into an aligned, through holes in pins 39 and 40. Seated in recesses 42 in the outer periphery of cylindrical portion 22b of brake member 22 are a pair of opposed coil springs 44 which engage narrow, relatively light weight arm sections 34b and 36b of pawls 34 and 36 through aligned recesses 45 therein and act to normally urge ends 34b and 36b of pawls 34 and 36 outwardly about pivot pins 39 and 40. In this normal position of use, enlarged outer end portions or arm sections 34a and 36a of pawls 34 and 36 will be pivoted inwardly against the peripheral surface of cylindrical section 22b.

Figure 2:
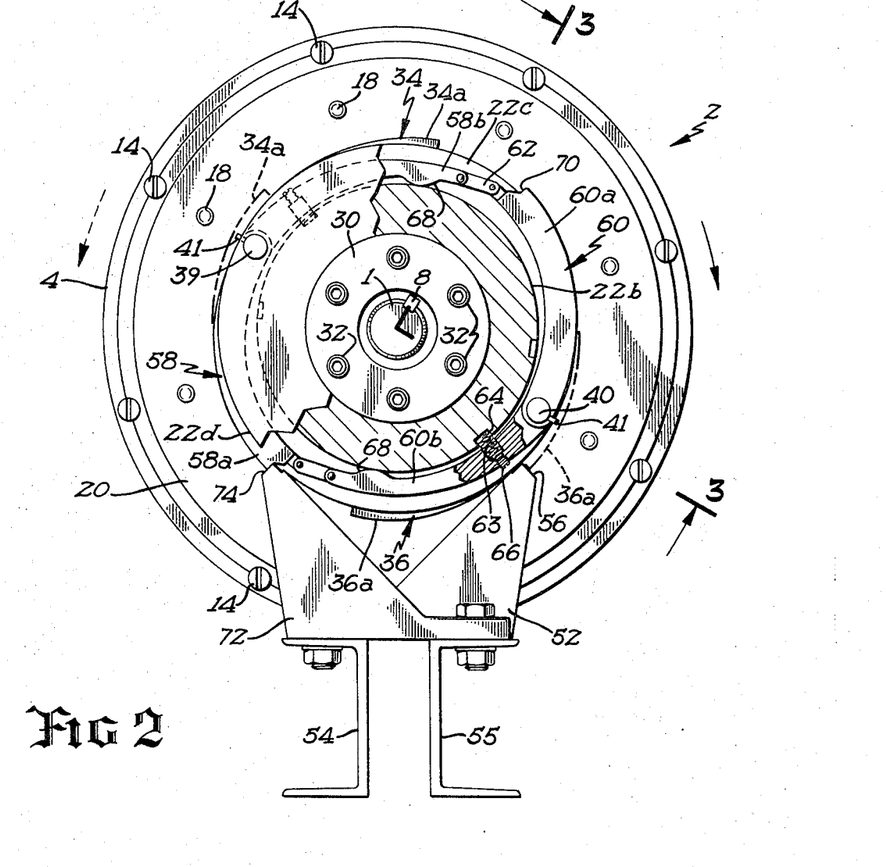
FIG. 2 is an end view of the brake assembly of FIG. 1 showing portions of the brake mechanism broken away and with the assembly rotated to a stop position.
Figure 6:
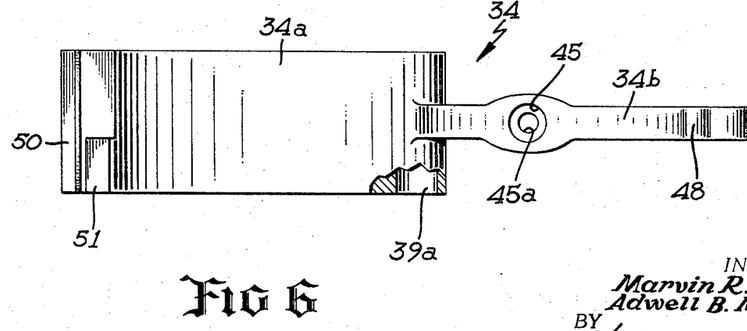
FIG. 6 is a plan view of one of the overspeed strike elements or pawls.

Coil springs 44 are placed in compression by screws 46 which extend through heavy end portions 34a and 36a of pawls 34 and 36 in threaded engagement with apertures 45a therein. Reference is made to FIG. 6 for a showing of one of the pawls 34 in a bottom, plan view wherein heavy and light end portions 34a and 34b as well as threaded aperture 45a are illustrated. The aperture through pawl 34 which receives pivot pin 39 is indicated by reference numeral 39a in FIG. 6. Spring retainer screws 46 are adjusted as desired to impart a predetermined compression force to springs 44 so that at a predetermined rotational speed of drive shaft 1, heavier end portions 34a and 36a of pawls 34 and 36 will be urged outwardly by centrifugal force against the restraining pressure of springs 44. When this occurs, springs 44 will be compressed inwardly towards the periphery of cylindrical segment 22b of annular brake member 22 and light end portions 34b and 36b of the pawls will swing inwardly until stop cam elements 48 thereon engage the periphery of cylindrical segment 22b of brake member 22. In this manner, cams 48 serve to limit the outward movement of pawl end portions 34a and 36a. In FIG. 2, pawls 34 and 36 are shown in the outwardly pivoted stop positions of end portions 34a and 36a which they will assume when the predetermined rotational speed of shaft 1, indicative of an overload or runaway condition, has been reached. In their rest positions of non-use, light end portions 34b and 36b of pawls 34 and 36 will be urged outwardly by springs 44, thereby causing heavy end portions 34a and 36a to be pivoted inwardly against the peripheral surface of cylindrical segment 22b of annular brake member 22.

Figure 7:
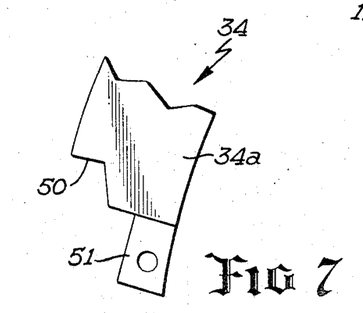
FIG. 7 is a fragmentary end view showing the profile of the contact end of the one of the pawls of FIG. 4.

The outer or leading edge of heavy end portions 34a and 36a of pawls 34 and 36 is provided with a contact surface in the form of a shoulder 50 shaped and located to strike the upper end of a first, stationary stop block 52 when pawls 34 and 36 are urged outwardly to their maximum extent under the effect of centrifugal force at a predetermined, maximum rotational speed of shaft 1. The contour and location of contact shoulders 50 on pawls 34 and 36 is illustrated with respect to pawls 34 in FIGS. 6 and 7. As may be noted most clearly with respect to FIG. 7, each of the pawls also includes an apertured extension tab 51 by means of which it is connected to the other one of the pawls by links 38. Reference is made to FIG. 2 for a showing of stationary stop block 52, heavy, contact end 34a of pawl 34 being shown in its stop position in contacting engagement with block 52 in phantom lines. Stop block 52 is bolted to channel iron beams 54 and 55 forming parts of a support assembly for the drive unit (not shown) coupled to drive shaft 1. An angled surface 56 at the upper end of stop block 52 serves as a contact surface for shoulder 50 of pawls 34 and 36. Stop block 52 is located in closely spaced relation to the rotary path of overspeed pawls 34 and 36 with its contact surface 56 facing in countering relation to the normal direction of rotation of drive shaft 1 in the manner illustrated in FIG. 2. Stop block 52 is thus oriented so that its contact surface 56 will be in position to be struck by contact shoulder 50 on either pawl 34 or pawl 36 in cooperative, stopping engagement therewith when these overspeed pawls are pivoted outwardly to their stop positions in response to the attainment of a predetermined rotational speed of drive shaft 1 indicative of an emergency condition.

Figure 1:
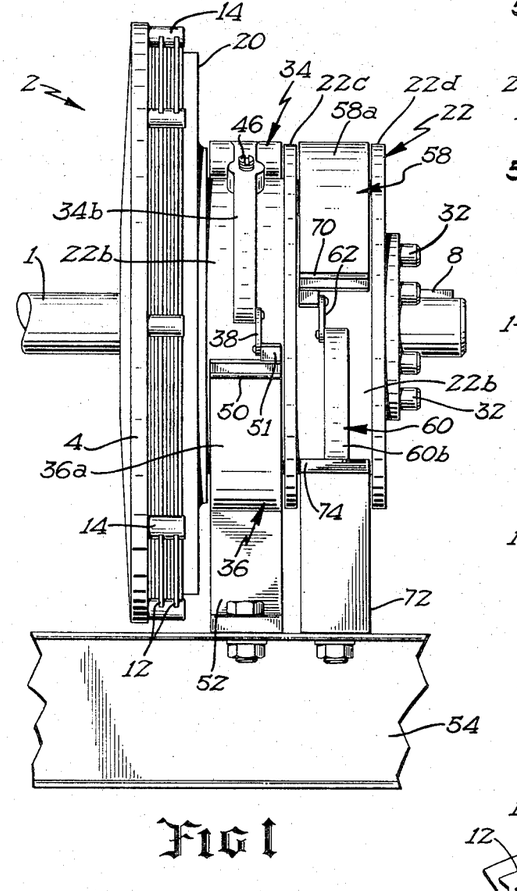
FIG. 1 is a side elevation view of the brake assembly of this invention.
Figure 3:
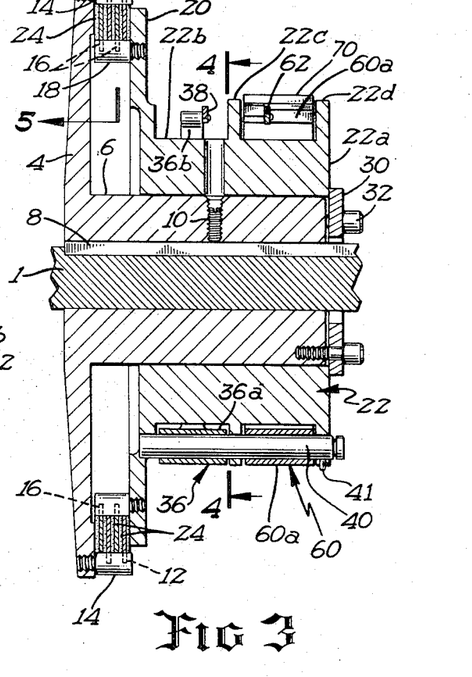
FIG. 3 is a vertical, section view of the brake assembly taken along lines 3—3 of FIG. 2.

In order to prevent reverse rotation of drive shaft 1, and thus to limit travel of an elevator or conveyor in a reverse or backwards direction, we have provided a second pair of pawls or strike elements 58 and 60 which are also mounted on annular brake member 22. This second set of pawls is constructed and arranged to replace the standard holdback devices of the wedge or roller type conventionally employed on elevator and conveyor head shafts to prevent reverse rotation. To distinguish from the first set of overspeed pawls 34 and 36, this second set of pawls 58 and 60 will be referred to herein as holdback pawls. Referring now to FIGS. 1, 2 and 3, it will be seen that pawls 58 and 60 are of the same, elongated, arcuate shape as overspeed pawls 34 and 36, and are also mounted in generally conforming relation to the outer peripheral contour of cylindrical segment 22b of annular brake member 22. Holdback pawls 58 and 60 are spaced apart from overspeed pawls 34 and 36 along the rotational axis of drive shaft 1 and are separated therefrom by annular collar 22c of brake member 22. Holdback pawls 58 and 60 are mounted on annular brake member 22 in inverted or oppositely oriented relation to overspeed pawls 34 and 36 to act as reverse stop devices in a manner hereinafter explained.

Holdback pawls 58 and 60 are connected together at their opposite ends by links 62 so that they will move together. The shape and configuration of holdback pawls 58 and 60 is preferably identical to that of overspeed pawls 34 and 36 shown in FIG. 4. As may be noted most clearly in FIG. 2, holdback pawls 58 and 60 are simply oriented in a reverse direction on annular brake member 22 with respect to overspeed pawls 34 and 36. Thus, holdback pawls 58 and 60 are comprised of relatively heavy end portions 58a and 60a respectively and narrow, lightweight end portions 58b and 60b, with these end portions extending on opposite sides of pivot pins 39 and 40. We have found that it is particularly effective and advantageous to support holdback pawls 58 and 60 on the same pair of pivot pins 39 and 40 on which overspeed pawls 34 and 36 are mounted, this supporting arrangement of the two pair of pawls on common pivot pins being illustrative most clearly in FIG. 3. Lightweight end portions 58b and 60b of holdback pawls 58 and 60 are engaged by a pair of opposed coil springs 63 seated in recesses 64 formed in the peripheral surface of cylindrical segment 22b of brake member 22. This spring arrangement is the same as that described above with respect to springs 44 which engage overspeed pawls 34 and 36. Springs 63 are held in place in aligned recesses formed in pawls 58 and 60 under a predetermined amount of compression by adjustable retainer screws 66. By virtue of this spring arrangement, light ends 58b and 60b of pawls 58 and 60 will normally be urged outwardly about pivot pins 39 and 40 with heavy end portions 58a and 60a being pivoted inwardly against the peripheral surface of cylindrical section 22b in a rest position of non-use. It is to be noted that the light end portions on the holdback pawls as well as on the overspeed pawls are sufficiently narrow so that they will not engage the stationary stop blocks even when urged outwardly by their respective springs 44 and 63. Pawls 58 and 60 also have cam elements 68 formed on the inside surface of light end portions 58b and 60b thereof, these cam elements serving to limit the inward pivotal movement of the light end portions of pawls 58 and 60 by contact with the surface of cylindrical segment 22b when heavy end portions 58a and 60a are urged outwardly under the influence of centrifugal force at a predetermined rotational speed of shaft 1. The leading edges of heavy end portions 58a and 60a of pawls 58 and 60 are formed to provide a stop surface 70 in the form of a shoulder as illustrated in FIG. 2. Because of the reverse orientation of holdback pawls 58 and 60 with respect to overspeed pawls 34 and 36, contact shoulders 70 of pawls 58 and 60 will face towards contact shoulders 50 of overspeed pawls 34 and 36 in opposing relation thereto as is illustrated in FIG. 1. Because of the inverted relation of the overspeed pawls and holdback pawls with respect to each other, the heavy ends 36a of pawls 34 and 36 will be adjacent the light end portions 58b and 60b of holdback pawls 58 and 60 in axially spaced relation thereto along drive shaft 1, as appears most clearly in FIG. 1.

A second, stationary stop member 72 is positioned adjacent to annular brake member 22 in closely spaced relation to the rotary path of holdback pawls 58 and 60, this second stop block 72 being spaced apart from the first stop block 52 along the rotational axis of drive shaft 1. Stop block 72 is also mounted on channel beams 54 and 55 and has an angled or inclined surface 74 at the top thereof serving as a contact surface for contact shoulders 70 of holdback pawls 58 and 60. To this end, stop block 72 is oriented oppositely from stop block 52 in the arrangement shown in FIG. 2 so that its contact surface 74 will face in a countering relation to reverse rotation of drive shaft 1 in a counterclockwise direction as indicated by the dotted arrow in FIG. 2. The upper ends of stop blocks 52 and 72 are formed identically with identically inclined contact surfaces 56 and 74, it being necessary to orient blocks 52 and 72 in the opposed relation shown in FIG. 2 in order to insure that their respective contact surfaces 56 and 74 will be in position to be struck by pawl contact shoulders 50 and 70 respectively. Contact surfaces 56 and 74 are so located immediately adjacent the rotary paths of the overspeed and holdback pawls as to offer no interference to the rotation of annular member 22 when shaft 1 is rotating at a normal speed and the heavy, contact ends of both the overspeed and holdback pawls are pivoted inwardly by springs 44 and 63.

In operation, the entire, double-acting brake assembly will rotate as a unit with head or drive shaft 1. If an overload and attendant overspeed condition on drive shaft 1 is encountered causing shaft 1 to rotate at a speed in excess of a predetermined safe speed in its normal direction of rotation, the braking device will be actuated by the effect of centrifugal force on overspeed pawls 34 and 36. When the maximum, predetermined rotational speed for which springs 44 are set is attained, heavy end portions 34a and 36a of pawls 34 and 36 will swing outwardly about pivot pins 39 and 40 to the positions shown in FIG. 4. Contact shoulder 50 on one or the other of pawls 34 or 36 will rotate into engagement with contact surface 56 on stop block 52 to bring annular brake member 22 to a stop. The use of two pawls 34, 36 or 58, 60 in the arrangement shown insures that drive shaft 1 will not rotate through more than one-half a revolution before one of the pawls engages a stop block. The two pawls 34 and 36 act as counter weights for each other, and interconnecting links 38 and 62 insure that as one pawl pivots outwardly under the effect of centrifugal force the other pawl will also move outwardly with it. The engagement of one of the pawl end sections 34a and 36a with stop plate 52 will immediately stop annular brake member 22 to which the pawls are attached, and driven brake discs 16 coupled thereto. The friction pressure between brake discs 12, 16 and 24 is adjusted by means of cap screws 32 so that when discs 16 stop with brake member 22, there will be some slippage between the braking discs, and discs 12 will continue to rotate with annular plate 4 and head shaft 1 through a limited amount of rotational travel. The frictional drag of discs 16 and 24 on discs 12 will brake discs 12, annular plate 4 and drive shaft 1 to a stop under predetermined overload conditions before potentially harmful and damaging runaway speeds of drive shaft 1 can be developed.

The same braking action of disc brake assembly 2 will be employed to stop drive shaft 1 upon the reverse rotation thereof by the actuation and operation of holdback pawls 58 and 60. If, for any reason, such as overload or mechanical failure, shaft 1 should start to rotate in the reverse direction indicated by the dotted arrow in FIG. 2 heavy ends 58a and 60a of holdback pawls 58 and 60 will be urged outwardly by centrifugal force to their stop positions shown in FIG. 2 when the predetermined rotational speed of shaft 1 for which springs 63 have been set is reached. We have found that satisfactory operation of holdback pawls 58 and 60 to prevent reverse rotation of shaft 1 may be achieved by utilizing the same compression setting on springs 63 as that employed on overspeed pawl springs 44. Under the potentially dangerous and damaging conditions of a loaded elevator or conveyor traveling in a reverse or backwards direction under free fall conditions, the effect of gravity will cause an excessive speed to be achieved very quickly. As a result, holdback pawls 58 and 60 will quickly pivot outwardly to their stop positions wherein contact surface 70 on one or the other of pawls 58 and 60 will rotate into engagement with contact surface 74 on stationary block 72 before shaft 1 has rotated through a further revolution. It would be possible to employ a lighter compression setting on springs 63 by the adjustment of screws 66 so as to cause holdback pawls 58 and 60 to be actuated to their stop positions at a slower rotational speed of shaft 1, thereby assuring only very limited elevator or conveyor travel in a reverse or backwards direction. Such a lighter compression setting on springs 63 for holdback pawls 58 and 60 would of course have to be at a setting which would not permit holdback pawls 58 and 60 to be urged outwardly to their stop positions under the influence of centrifugal force at speeds under that at which shaft 1 normally rotates in its forward or normal direction of rotation.

Figures 4, 8, 10:
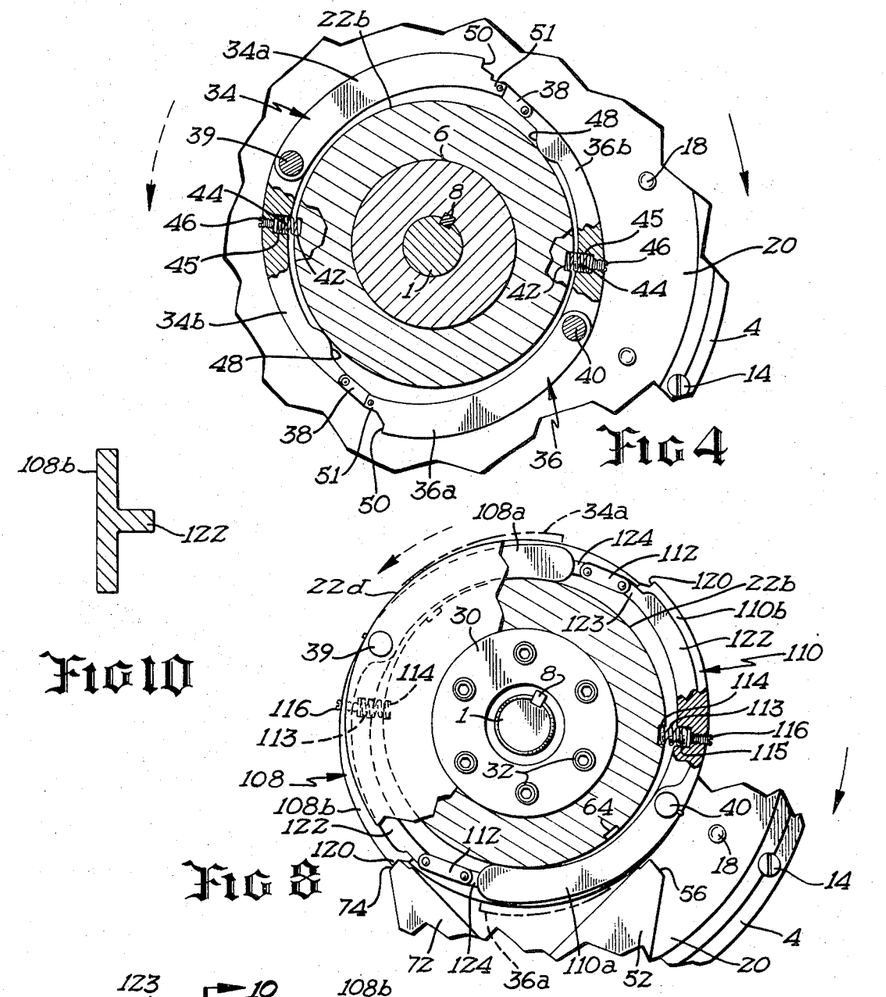
FIG. 4 is a vertical section view of the brake assembly taken along lines 4—4 of FIG. 3 and showing only the overspeed strike elements.
FIG. 8 is an end view of an alternative form of the brake assembly.
FIG. 10 is a vertical section view taken along lines 10—10 of FIG. 9.
Figure 9:
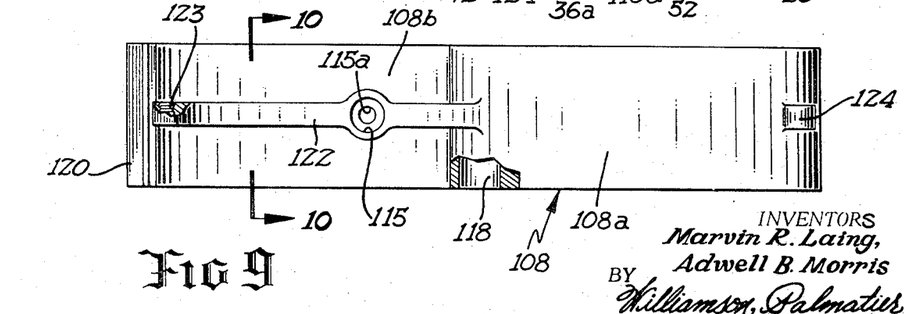
FIG. 9 is a plan view of one of the holdback strike elements or pawls used in the form of the brake assembly shown in FIG. 8.

In FIGS. 8, 9 and 10, I have shown an alternative embodiment of a holdback pawl arrangement for the double acting brake. In the arrangement shown in FIGS. 8, 9 and 10, overspeed pawls 34 and 36 are constructed and arranged in exactly the same manner as described above and as shown in FIGS. 1, 3 and 4. Referring now to FIG. 8, it will be seen that holdback pawls 108 and 110 are again of elongated, arcuate configuration and are disposed in surrounding relation to the outer, peripheral surface of cylindrical segment 22b of annular brake member 22. In this embodiment, however, the pawl springs are so located with respect to the pawl pivot pins as to normally urge the contact ends of the pawls outwardly to a stop or contact position, as compared to relying on centrifugal force to urge the pawls to a contact position. Pawls 108 and 110 each have a relatively heavy end portion 108a and 110a respectively disposed on opposite sides of pivot pins 39 and 40 from light end portions 108b and 110b. Diametrically opposed coil springs 113 are seated in recesses 114 in cylindrical segment 22b of brake member 22 at locations on the opposite sides of pivot pins 39 and 40 from that shown for springs 63 in FIG. 2. The different location of spring seats 114 with respect to spring seats 64 of the holdback pawl embodiment shown in FIG. 2 may be noted in FIG. 8. Springs 113 are received within aligned recesses 115 in light end portions 108b and 110b of pawls 108 and 110 and are held in place under a predetermined degree of compression by adjustable retaining screws 116. Holdback pawls 108 and 110 are of identical configuration, the structure of pawl 108 being shown in FIGS. 9 and 10. As may be noted with respect to these figures, as well as to FIG. 8, light end portion 108b of pawl 108 is relatively thin in comparison to heavy end portion 108a; and a through hole 118 for receiving pivot pins 39 and 40 is formed in heavy end section 108a where it merges with light end section 108b substantially midway of the length of pawl 108. In contrast to the pawl structure shown and described with respect to holdback pawls 58 and 60, contact shoulders 120 are formed on the light end portions 108b and 110b of pawls 108 and 110, rather than on heavy end portions 108a and 110a thereof. The pawl contact surfaces defined by shoulders 120 are of exactly the same profile as that illustrated in FIG. 7 for pawls 34, 36 and 58, 60. Since light end portions 108b and 110b of pawls 108 and 110 have the contact surfaces 120 formed thereon and will thus sustain the shock and impact load of contact with surface 74 of stationary stop block 72, these light weight ends are reinforced by a strengthening rib 122 extending over the entire length thereof at substantially right angles thereto as is illustrated in FIGS. 9 and 10. On the forward or leading end of strengthening ribs 122 there is formed an extension coupling or tab 123 which is apertured for attachment to connecting links 112. At the opposite end of each of the pawls 108 and 110 there is formed an apertured lug 124 on heavy end portion 108 for attachment to the other one of the links 112.

By virtue of the location of springs 113 with respect to pivot pins 39 and 40, and the engagement of these springs with light end portions 108b and 110b of pawls 108 and 110, these light end portions of the holdback pawls will normally be urged outwardly to the stop positions of use shown in FIG. 8. When drive shaft 1 is operating in its normal direction of rotation as indicated by the solid arrow in FIG. 8, contact shoulders 120 of end portions 108b and 110b of pawls 108 and 110 will not be effective to stop or interfere with the rotation of annular brake member 22 since they are facing in a direction opposed to the normal direction of rotation of shaft 1 and thus will not cooperate with either of the stop surfaces 56 or 74 to stop drive shaft 1 under normal operating conditions.

If, for any reason, such as a mechanical failure or an overload condition, drive shaft 1 should start to rotate in the reverse direction indicated by the dotted arrow in FIG. 8, one of the contact surfaces 120 on either pawl 108 or on pawl 110 will immediately come into stopping engagement with contact surface 74 on reverse stop block 72 before shaft 1 has rotated through more than one-half of a revolution. This is so because contact shoulders 120 are normally urged outwardly by springs 113 to their stop positions and there is thus no need for a predetermined, rotational speed of shaft 1 to be achieved in the reverse direction before pawls 108 and 110 and shoulders 120 thereon operate to bring shaft 1 to a stop. In this respect, the holdback pawl arrangement of FIGS. 8 through 10 has an operating advantage over that described with respect to holdback pawls 58 and 60 of FIGS. 1, 2 and 3.

From the foregoing description, it will be understood that regardless of whether one of the overspeed pawls is actuated to stop brake member 22 in the normal direction of rotation of shaft 1 or one of the holdback pawls is actuated to prevent reverse rotation of shaft 1, annular brake member 22 will cooperate in either case with brake disc assembly 2 to provide positive stopping action of shaft 1 with a minimum of shock to the drive mechanism so as to avoid mechanical damage. This is accomplished by disc brake 2 by virtue of the particular arrangement of the multiple braking discs assembled as described herein. Substantially all of the impact shock resulting from the contact of one of the pawls with one of the stop members 52 or 72 is absorbed by the plurality of braking discs in frictional coaction with each other. The multiplicity of brake discs and friction discs 12, 16, and 24 provides a large amount of braking surface to provide positive stopping action without halting the drive mechanism so abruptly to break or severely damage any portion thereof. The location of discs 12, 16 and 24 radially outwardly from shaft 1 provides braking force at a relatively large radial distance from the axis of rotation of shaft 1 to thereby generate a maximum amount of braking torque. It is significant to note that these advantageous braking and shock absorbing features of the disc brake assembly 2 are achieved in cooperation with holdback pawls 58, 60 or 108, 110 when stopping the reverse rotation of shaft 1. This is a distinct advantage over conventional holdback devices which are normally mounted directly on the drive or head shaft and do not have the advantage of cooperating with a brake of any kind, and especially not the disc brake shown and described herein, to provide positive stopping action in combination with a shock absorbing effect.

Although we have shown and described our double acting brake with respect to particular, preferred embodiments thereof, we anticipate that various changes may be made in the size, location and manner of assembly of the various parts without departing from the spirit and scope of our invention as defined by the following claims.

I claim:

1. A double acting brake mechanism for the primary rotary drive shaft of an elevator comprising:
   an annular brake member mounted on said drive shaft and normally rotating therewith;
   an overspeed strike element pivotally attached to said annular brake member of rotation therewith and pivotally displaceable from a rest position of non-use to a stop position under the influence of centrifugal force at a predetermined rotational speed of said drive shaft, said overspeed strike element having a contact surface thereon;
   a first, permanently stationary stop member secured to a fixed support structure and positioned adjacent to said annular brake member in closely spaced relation to the rotary path of said overspeed strike element and having a contact surface thereon, facing in countering relation to the normal direction of rotation of said drive shaft in position to be struck by said contact surface on said overspeed strike element in cooperative, stopping engagement therewith when said overspeed strike element is pivoted to said stop position in response to the attainment of said predetermined rotational speed;
   a holdback strike element for limiting reverse rotation of said drive shaft, pivotally attached to said annular brake member for rotation therewith and pivotally displaceable from a rest position to a stop position under the influence of centrifugal force at a predetermined rotational speed of said drive shaft, said holdback strike element having a contact surface thereon facing in the opposite direction from said contact surface on said overspeed strike element;
   a second, permanently stationary stop member secured to a fixed support structure and positioned adjacent to said annular brake member in closely spaced relation to the rotary path of said holdback strike element and having a contact surface thereon facing in countering relation to reverse rotation of said drive shaft from said normal direction of rotation in position to be struck by said contact surface on said holdback strike element in cooperative, stopping engagement therewith when said holdback stop element is pivoted to said stop position;
   a rotary brake member secured to said shaft and normally rotating therewith; and
   brake coupling means between said rotary brake member and said annular brake member operative to stop said rotary brake member, and thus said drive shaft in response to the stopping of said annular brake member by the engagement of one of said strike elements with one of said stop members.

2. A double acting brake mechanism as defined in claim 1 wherein:
   said overspeed strike element and said holdback strike element are both of elongated, arcuate shape generally conforming to the outer peripheral contour of said annular brake member and are positioned in surrounding relation to the outer surface thereof of axially spaced apart locations along the rotational axis of said drive shaft, each of said strike elements being attached to said annular brake member by a common pivot pin extending through each of said strike elements and through raised portions on the periphery of said annular brake member in a direction generally parallel to said rotational axis; and
   said first and second stop members are axially spaced apart along said rotational axis of said drive shaft with their respective contact surfaces facing in countering relation to opposite directions of rotation of said annular brake member immediately adjacent the rotational paths of said overspeed strike element and said holdback strike element respectively.

3. A double acting brake mechanism as defined in claim 2 wherein:
   each of said arcuate strike elements has a relatively heavy end on which said contact surfaces are formed on a leading edge thereof and an opposite, relatively light end between which said common pivot pin extends; and
   spring means normally urging said light end of each of said strike elements outwardly away from the peripheral surface of said annular brake member and thereby tending to pivot said heavy end of each of said strike elements inwardly about said pivot pin to said rest positions, and said strike elements being oriented in inverted relation to each other on said annular brake member with the heavy end of one strike element being axially adjacent the light end of the other strike element and the contact surfaces of said strike elements facing towards each other in opposing relation.

4. A double acting brake mechanism as defined in claim 1 wherein said coupling means comprises a brake assembly comprised of:
   said rotary brake member in the form of an annular braking plate secured to said drive shaft for rotation therewith;
   a plurality of annular, driving discs coupled to said braking plate for rotation therewith, said driving discs lying in planes normal to the axis or rotation of said drive shaft and being spaced along said axis;

a plurality of driven, annular braking discs extending parallel to said driving discs and spaced along said axis of rotation, said discs being interleaved in frictional association with each other, said annular brake member including an annular wall portion spaced along said axis of rotation from said braking plate and cooperating therewith to clamp said driving and driven discs therebetween, said driven discs being coupled to said annular wall portion for rotation therewith, and said annular brake member further including an elongated cylindrical segment on which said overspeed strike element and said holdback strike element are pivotally mounted in spaced apart relation along said axis of rotation, whereby said driven discs will stop with said annular brake member and will brake said braking plate and drive shaft to a stop within limited rotational movement of said drive shaft by frictional engagement with said driving discs.

5. A double acting brake mechanism as defined in claim 4 wherein:

said annular braking plate includes an elongated, cylindrical hub on which said cylindrical segment of said annular brake member is slidably adjustable in a direction parallel to said axis of rotation; and said driving and driven discs are coupled to said braking plate and to said annular wall portion of said brake member respectively by elongated coupling members on which said discs are shiftable in a direction parallel to said axis of rotation, whereby the frictional coaction between said discs may be increased or decreased as desired to achieve a predetermined braking force by slidably adjusting said annular brake towards or away from said annular braking plate.

6. A double acting brake mechanism as defined in claim 5 wherein:

said driving and driven discs have apertures therein through which said elongated coupling members extend, said driving and driven discs having outer and inner peripheral portions radially offset with respect to each other, and said elongated coupling members for one of said plurality of discs being located radially outwardly beyond the outer periphery of the other plurality of discs and the elongated coupling members for said other plurality of discs being located radially inwardly from the inner periphery of said one plurality of discs.

7. A double acting brake mechanism for a rotary drive shaft of an elevator comprising:

an annular brake member mounted on said drive shaft for rotation therewith;

a first, stationary stop member positioned adjacent said annular brake member and having a contact surface thereon disposed in countering relation to the normal direction of rotation of said annular member;

an elongated overspeed strike element pivotally mounted on the outer periphery of said annular brake member for rotation therewith by means of a pivot pin extending generally parallel to the rotational axis of said drive shaft, said overspeed strike element having a first end portion on one side of said pivot pin on which is formed a contact surface shaped to cooperate with said contact surface on said first stop member and which is relatively heavy in comparison to a light end portion of said overspeed strike element on the other side of said pivot pin;

a spring normally urging said light end of said overspeed strike element outwardly away from the peripheral surface of said annular brake member and thereby pivoting said heavy end and contact surface thereof inwardly about said pivot pin to a rest position wherein said contact surface will not engage said first stop member as said annular brake member rotates, said heavy end of said overspeed strike element being pivotal outwardly away from the periphery of said annular brake member under the influence of centrifugal force at a predetermined rotational speed of said drive shaft to a stop position wherein said contact surface thereon will engage said contact surface on said first stop member to bring said annular brake member to a stop;

a second, stationary stop member positioned adjacent to said annular brake member and having a contact surface thereon oriented to counter the rotation of said annular brake member in a direction opposite to said normal direction of rotation;

an elongated, holdback strike element pivotally mounted on the periphery of said annular brake member for rotation therewith by means of a pivot pin extending generally parallel to the rotational axis of said drive shaft, said holdback strike element having a first end portion on one side of said pivot pin which is relatively heavy in comparison with a light end portion on the other side of said pivot pin, said light end portion of said holdback strike element having a contact surface thereon shaped to cooperate with said contact surface on said second stop member and facing in the opposite direction from said contact surface on said overspeed strike element;

a spring normally urging said light end of said holdback strike element and said contact surface thereon outwardly away from the peripheral surface of said annular brake member to a stop position wherein said contact surface will rotate into stopping engagement with said contact surface on said second stop member upon the reverse rotation of said drive shaft in a direction opposite to said normal direction of rotation; and coupling means cooperative with said annular brake member to stop said drive shaft in response to the stopping of said annular brake member.

8. A double acting brake mechanism as defined in claim 7 wherein:

said overspeed strike element and said holdback strike element are both of arcuate shape generally conforming to the outer peripheral contour of said annular brake member and are positioned in surrounding relation to the outer surface thereof at spaced apart locations along the rotational axis of said drive shaft, each of said strike elements being attached to said annular brake member by a common pivot pin extending therethrough and through raised portions on the periphery of said annular brake member in a direction generally parallel to said rotational axis.

* * * * *